Figure 2:
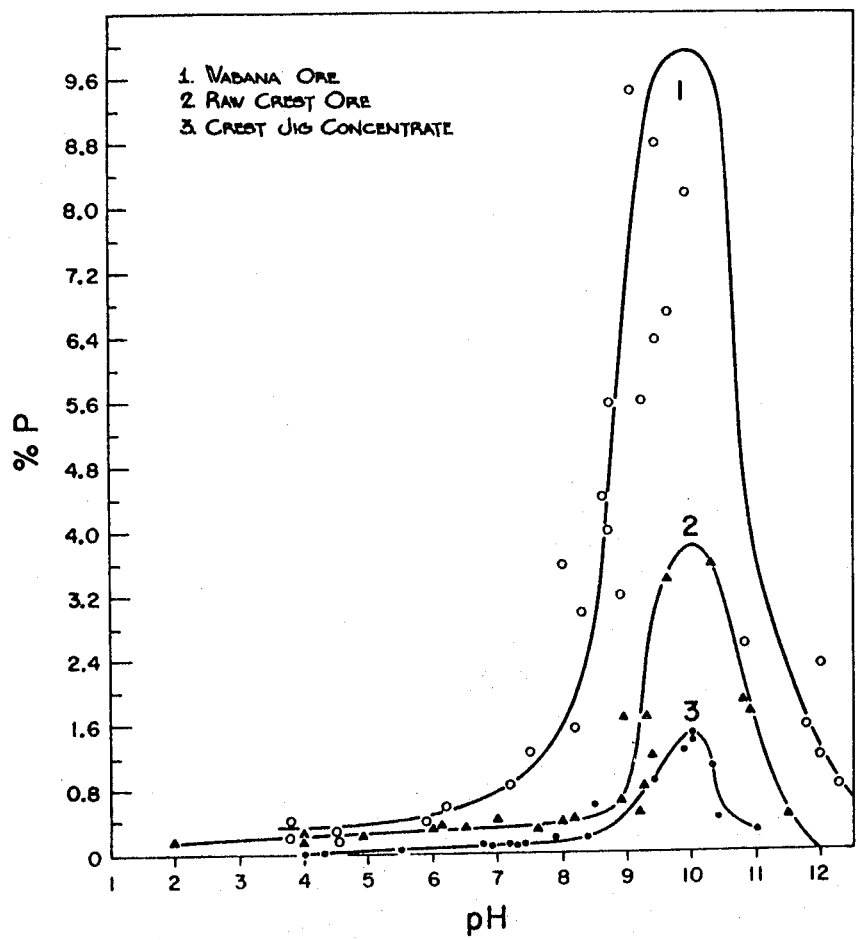

United States Patent
Sirianni et al.

[15] 3,661,254
[45] May 9, 1972

[54] PROCESS FOR SEPARATION OF SILICEOUS AND PHOSPHATIC MATERIAL FROM IRON ORE

[72] Inventors: Aurelio F. Sirianni; Ira E. Puddington, both of Ottawa, Ontario, Canada

[73] Assignee: Canadian Patents and Development Limited, Ottawa, Ontario, Canada

[22] Filed: Apr. 28, 1969

[21] Appl. No.: 819,600

[30] Foreign Application Priority Data

June 7, 1968 Canada..................................022,002

[52] U.S. Cl..................................................209/5, 209/171
[51] Int. Cl.........................................................B03d 3/06
[58] Field of Search..........75/2; 209/5, 9, 166, 171, 162-164

[56] References Cited

UNITED STATES PATENTS

| | | | |
|---|---|---|---|
| 1,367,223 | 2/1921 | Appelquist | 209/171 |
| 1,585,755 | 5/1926 | Borcherdt | 209/5 X |
| 2,475,581 | 7/1949 | Booth | 209/166 |
| 3,268,071 | 8/1966 | Puddington | 209/5 |
| 3,399,765 | 9/1968 | Puddington | 209/171 X |
| 3,430,762 | 3/1969 | Weston | 209/5 |
| 3,314,537 | 8/1907 | Greene | 209/5 |

OTHER PUBLICATIONS

Flotation, Gaudin, 2nd Edition, pg. 123 (1957)
Froth Flotation, 50th Anniversary Volume, pgs. 206- 211

*Primary Examiner*—Frank W. Lutter
*Assistant Examiner*—Robert Halper
*Attorney*—Weir, Marshall, MacRae & Lamb

[57] ABSTRACT

Siliceous and phosphatic material is separated from iron ore by subjecting a finely ground body of such ore in aqueous suspension to treatment with a conditioning agent which causes selective species in the ore body to become hydrophobic, and a hydrocarbon oil is employed with agitation to cause preferential agglomeration of the hydrophobic particles. Water may be added during the treatment to decrease the pulp density. There is thus formed a densely packed phase agglomerated by the oil, and a residual aqueous phase, the oil phase being rich in P or iron and the other phase being rich in iron or phosphorous, respectively. These agglomerates are easily separated to recover the desired products. The pH of the mixture is suitably adjusted during the treatment and separation steps for most effective results by additions of certain acids and alkalis.

3 Claims, 2 Drawing Figures

PROCESS FOR SEPARATION OF SILICEOUS AND PHOSPHATIC MATERIAL FROM IRON ORE

There exists extensive iron ore deposits chemically complicated by an intimate mixture of siliceous and phosphatic (usually apatite) gangue material. These ore bodies require fine grinding in order to separate selectively the iron units. Such ores do not respond easily to beneficiation by conventional methods such as flotation, gravitation, and magnetic separation, etc., owing to the fine state of subdivision required for physical release of all constituents. Although it is possible to decrease the phosphatic material to a tolerable level by leaching with a mineral acid, the cost is usually prohibitive, particularly if the amount of apatite is too small for the economic recovery of the phosphorus. Further complications arise owing to the presence of carbonate minerals which are usually more easily attacked by acids in the leaching operation, with a consequent increase in the amount of acid required.

Examples of such ore bodies which are difficult to beneficiate are the Snake River (Yukon) sedimentary ore (Crest), and the Wabana (Newfoundland) natural fines. Wabana ore is further complicated since 15–30 percent of iron content is combined in the form of chamosite, a stable aluminous ferrous silicate (which is second to hematite (in occurrence) as an iron-bearing mineral).

Attempts have heretofore been made to beneficiate dressed samples of Crest Ore by the selective-flocculation+ anionic-flotation-of-silica process followed by sulfuric acid leaching of select middling products at the United States Bureau of Mines. The results indicated that success of this process seemed to be dependent on utilizing a high grade jig concentrate as flotation feed. A high grade jig concentrate containing about 60.5 percent Fe and 0.152 percent P, yielded low silica bearing flotation concentrates with barely acceptable phosphorus levels. Using a heavy media cyclone concentrate as feed (containing about 57.3 percent Fe and 0.22 percent P), flotation test results indicated that phosphorus minerals and silica would not respond readily to flotation separation. The investigators concluded that this material was refractory to both phosphorus and silica removal. It may be assumed, therefore, that beneficiation of raw Crest ore containing about 40–42 percent Fe and 0.33 percent P to a merchantable product (Fe content at least 60 percent, acid-insolubles less than 6 percent, and P content less than 0.09 percent) would be virtually impossible by flotation. The preferred product is at least 65 percent Fe and less than 0.07 phosphorus.

Raw ore from the Snake River deposit has been heretofore examined under conventional separation processes in laboratories such as the Mitsui Company in Japan, the Department of Mines in the United States, and the Mines Branch in Canada. The general conclusion was that only the jig concentrate which recovers less than 70 percent of the available iron in the raw ore at a grade of 60 percent Fe with 0.15 percent P and 10 percent of acid-insolubles was useful feed stock. Even with this as a feed successful upgrading with acceptable Fe recoveries was not effected without acid leaching.

The present invention seeks to provide an economically feasible method of separating siliceous and phosphatic material from iron materials containing such impurities intimately dispersed therein.

Figure 1:
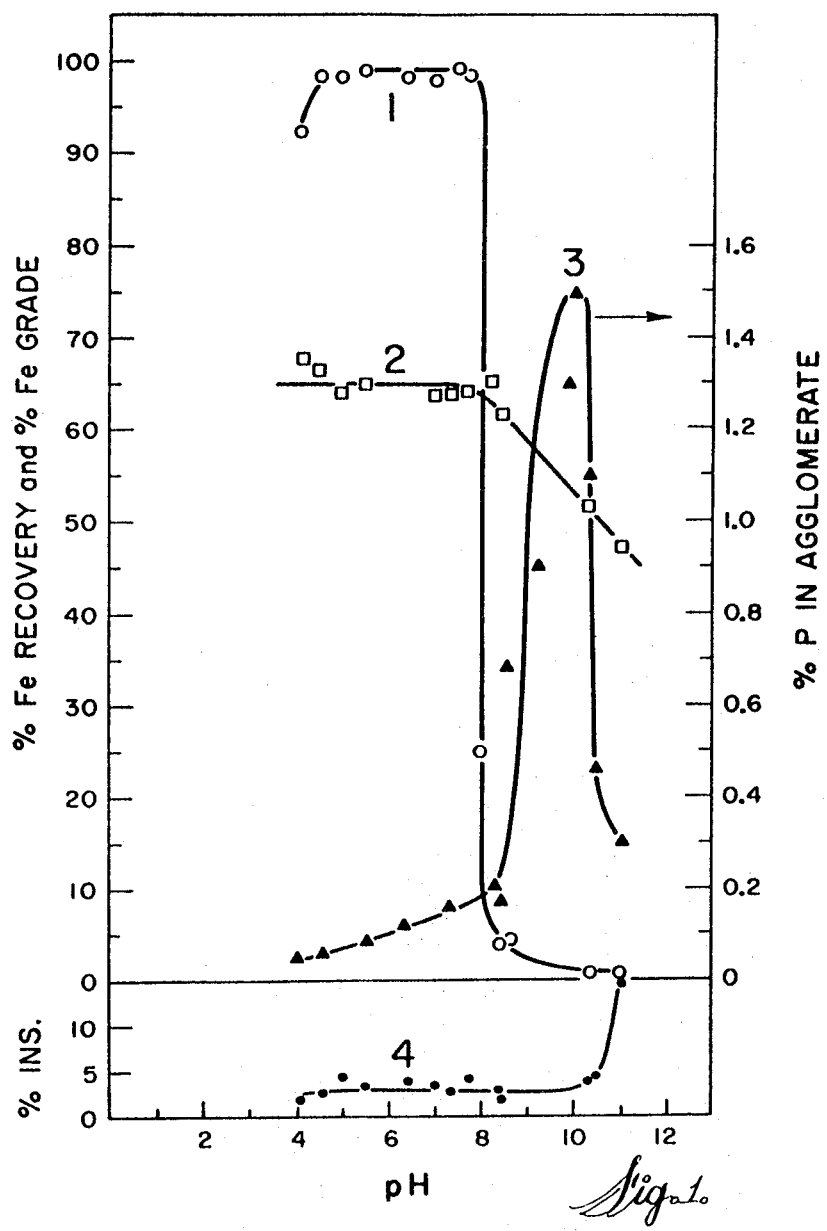

The invention will be described with reference to the accompanying drawings, in which FIG. 1 is a graph showing percent Fe recover, percent Fe in the concentrate, percent P in the agglomerate (concentrate), and percent silica in the concentrate, using a jig concentrate sample of Crest ore, in relation to pH, and FIG. 2 is a graph illustrating the separation in terms of grade of P removed with relation to pH (for various feeds).

As indicated, the iron-containing material to be treated is finely ground either before or during the treatment. For most effective results, the types of ore described above should be ground to a fineness that will physically release the desired constituent for the gangue, i.e., in the order of at least −325 mesh Tyler. A preferred size is about −400 mesh.

The conditioning agent is selected from the polar surface active agents. The most useful are sulphonic acids and fatty acids, especially oleic, linoleic, and tall oil acids and their soluble alkali metal or ammonium salts. The amounts of conditioning agents are not critical but are usually within the range 0.5 to 6 lb/ton or 0.02 to 0.3 percent. Conditioning may be done at up to about 50 percent solids. Amine conditioners in small amounts such as that sold by Hercules Powder Company under the trade name "AMINE D" (high molecular weight amine derived from pine resin acids), may be employed along with sulfonic or fatty acids for some improvement in results.

A hydrocarbonaceous mineral oil is used as a bridging liquid in the formation of an agglomerate phase. Various crude oils are suitable for the purpose, such as Baccaquero crude and Lloydminster crude. Processed oils may also be used. Preferably, the oils are slightly oxidized since oxidized oils appear to act somewhat more efficiently as collectors. In small scale experimental tests, oils were oxidized to a desirable extent by blowing air through the oil in open beakers at about 150° C. for about 48 hours. The amounts of bridging liquid may vary considerably with a suitable range being about 50 to 130 percent by volume of the solids.

Adjustments in initial pH of the slurry or suspension of ore particles in mixture with the conditioning agent and oil may be made by additions of acids such as sulfuric, hydrochloric, hydrofluosilicic, oxalic, and formic. The pH of the operating circuit may be adjusted with alkalis such as NaOH, KOH, $Na_2CO_3$, and $Ca(OH)_2$, or a combination thereof. When operating at an elevated pH it has been found useful to use an iron depressant such as dextrin. From the test results, it is apparent that by operating above pH 8 the agglomerated phase is rich in P, and poor in iron. In a second step at a lower pH (e.g. 4–8) the agglomerate is rich in iron with high iron recoveries.

The amount of water present during the agglomeration may vary considerably but for best results the desirable range is about 10 to 30 percent solids.

The following examples are illustrative of the method of the present invention.

The feed stock used in Examples I to IV was a jig concentrate sample of raw Crest ore ground to −400 mesh and concentrated by filtration to about 70 percent solids. The results of Examples I to V are summarized in Table I.

EXAMPLE I

About 50 g of feed ore was mixed in a kettle fitted with countercurrent stirrers giving an efficient mixing-kneading action for about 3 minutes with 18 g Baccaquero crude oil and 0.05 g sodium oleate and 0.04 g linoleic acid. The thick paste was diluted with water to about 25–30 percent solids. The slurry was then acidified with 3.3 lb/ton feed sulfuric acid and 6.7 lb/ton feed 30 percent hydrofluosilicic acid. The aqueous slurry at pH 4.0 was decanted. The oleagenous phase containing the iron units was eluted with water to remove siliceous and phosphatic matter. Further quantities of acid insolubles were separated by washing with dilute sodium carbonate solution up to pH 9.0. The unagglomerated residue containing the P and siliceous matter, and the washings were combined and ashed as tailings.

EXAMPLE II

About 50 g of feed stock containing about 35 g ore was mixed in a kettle as in Example I, with 0.033 g sodium linoleate and 18 g Baccaquero crude oil for about 5 minutes. Then 100 ml of water were added containing 1 lb/ton HCl and 6.8 lb/ton 30 percent hydrofluosilicic acid. After through mixing the aqueous slurry at pH = 4.1, containing mostly unagglomerated gangue, was decanted. The oleagenous phase containing the iron units was eluted with fresh water, then followed with dilute sodium carbonate up to pH 10.3. The aqueous media which contained most of the siliceous and phosphatic gangue materials was ashed as tailings.

EXAMPLE III

About 50 g of feed stock containing about 35 g ore was mixed in a kettle as in Example I with 100 ml of water, 5 ml 1 percent sodium linoleate (0.05 g), and 18 g Baccaquero crude oil. The iron units were collected in the oil phase and substantial amounts of clayish residues remained suspended in water. The aqueous suspension at pH 7.8 (natural pH) was decanted. Additional clayish residues were washed out by elution with water. The agglomerated product was given an alkaline wash with dilute sodium carbonate (to remove the siliceous matter) then followed with a water wash. The agglomerate was mixed with water (100 ml.) and then acidified with 1.8 lb/ton sulfuric acid and 3.3 lb/ton 30 percent hydrofluosilicic acid. After about 1 our mixing time in grease kettle the aqueous slurry was decanted. The oil phase containing the iron product was eluted with water. The combined water washes were added to the unagglomerated residues and ashed as tailings, containing the phosphatic and siliceous material. In this example, the pH was in the borderline region for acceptable P rejection.

EXAMPLE IV

About 50 g of feed stock containing about 35 g ore were mixed with 2.4 lb/ton NaOH, 25 ml water and 1 lb/ton tall oil acids (sold under the trade name "Pamak 4" by Hercules Powder Company) in a porcelain ball mill for 70 minutes using 10 flint balls. Then 9 g of Baccaquero crude oil and 100 ml water were added and the system ball-milled for 105 minutes. The suspension at about pH 9.4 was decanted, and the oil agglomerate containing the phosphatic material was eluted with water several times. The washings were added to the tailings which contained the iron product and most of the siliceous matter. Desirably the iron units are separated from the siliceous gangue in a second step at a lower pH (see Example V).

EXAMPLE V

A suspension was prepared by grinding 3,000 g of the jig concentrate of Crest ore in a rod mill at 50 percent solids to $-400$ mesh Tyler. The aqueous suspension was adjusted to pH 10 with 2 lb/ton NaOH and 0.5 lb/ton $Na_2CO_3$. The feed was diluted to 27.5 percent solids and conditioned with 1 lb/ton of tall oil acids ("Pamak 4"). In the first step, about 700 ml of this suspension in 175 ml aliquots was intimately contacted at pH 10 with 35 g oil (oxidized Lloydminster crude) in the stirred kettle for about 40 minutes. Under these conditions, the phosphatic material was contained in the oil phase while the iron and siliceous matter remained in the aqueous phase. Included iron was eluted from the oil phase with water. The water elutions and the tails were combined and neutralized to pH 7.3 with sulfuric acid. The iron units were then separated in a second step as follows:

After settling the supernatant liquid was decanted from the settled material and the settled material was used as feed stock in the second step of the operation. The iron units were agglomerated (at pH 7.3) with 140 g of oxidized Lloydminster crude in the agitated kettle. The agglomerate now containing the iron units was eluted with water and then with an alkaline wash containing sodium carbonate. The aqueous suspensions were combined and ahsed as tailings. The phosphatic product (step one) and iron product (agglomerates) were also ashed.

TABLE I

[Summary of Tests on Jig Concentrates, Examples I-V]

| Example number | Agglomerated fraction, percent | | | Tailings, percent | | |
|---|---|---|---|---|---|---|
| | Fe recovery | Acid insolubles | P | Fe | Acid insolubles | P |
| Untreated feed | 59.6 | | 11 | 0.15 | | |
| I | 66.4 | 98.6 | 3.0 | 0.061 | 7.2 | 81.5 | 0.83 |
| II | 67.8 | 92.5 | 2.0 | 0.054 | 26.2 | 56.3 | 0.57 |
| III | 65.2 | 99.4 | 3.7 | 0.088 | 3.8 | 94.0 | 0.76 |
| IV | 56.3 | 10.6 | 4.2 | 0.90 | 61.6 | 10.8 | 0.056 |
| V: | | | | | | | |
| 1st step | 45.8 | 3.53 | 4.1 | 1.48 | | | |
| 2nd step | 66.1 | 96 | 3.1 | 0.07 | 5.9 | 89.7 | 0.016 |

It will be observed that, in Examples I-III, substantial amounts of apatite are separated with the tailings by a one-step agglomeration acid-leaching procedure, and that products with high recoveries of iron units are found in the oil phase. A pH of about 4 to 5.5 is preferred for low phosphorous products, with the preferred conditioners being fatty acid type.

Examples IV and V show that it is possible to collect selectively a substantial amount of phosphatic material in the oil phase at an elevated pH as a first step and then to collect the iron units from the tailings in a second step (desirably an agglomeration at a lower pH value). Usually no further conditioning is required for this second agglomeration step.

In further tests, a first step conditioning treatment using as a conditioner a combination of a minor proportion of sulfonic acid of long chain hydrocarbons, e.g., branched chain alkyl benzene, and a major proportion of tall oil acids ("Pamak 4" or "Pamak C15" containing 4 or 15 percent of rosin acid, respectively, of Hercules Powder Company), at the elevated pH, gave unexpectedly good P removal. The iron units were present in the tailings and are separated in a second step at a lower pH. The following examples are illustrative.

EXAMPLE VI (A) About 95 g of powdered raw Crest iron ore, 75 ml water and 25 ml N/10 NaOH were mixed for 30 minutes in a 6 inch porcelain jar using 25 flint and two ⅝ inch steel balls. The mixture at pH 11.3 was conditioned with 1.6 lb/ton of sulfonic acid of branched chain alkyl benzene and 4 lb/ton "Pamak 4." About 0.025 lb/ton dextrin and 0.025 lb/ton "Amine D" (Hercules Powder Company), were added to depress iron and to aid in the collection of siliceous matter, respectively. The slurry was ball milled for 1 hour, then 15.4 g oxidized Lloydminster crude oil was added to collect the phosphorus fraction in step (A) while comminuting the iron ore particles to $-400$ mesh Tyler. After 20 hours grinding, the oil agglomerate, (then at pH 8.8) was eluted three times with water, 125 ml each time.

In the second step (B), the aqueous tailings from (A) were neutralized to about pH 6 with sulfuric acid. The iron units were agitated and agglomerated in a kettle with a mixture of Lloydminster and Baccaquero crudes. Included siliceous matter was eluted from the oleagenous phase with water and with a sodium carbonate wash. The results obtained are summarized in Table II

TABLE II

| Fraction | Percent Fe | Total Fe units | Percent $SiO_2$ | Percent P |
|---|---|---|---|---|
| Raw crest ore feed | 40.8 | 100 | 30 | 0.34 |
| (A) P fraction | 33.2 | 12.1 | 12.9 | 1.71 |
| (A) tailings | 43.3 | 87.9 | 35.8 | <0.02 |
| (B) Fe product | 67.0 | 76.1 | 2.87 | 0.066 |
| (B) tailings | 14.7 | 11.8 | 76.4 | 0.02 |

A recovery of 76.1 percent of the total iron units with a grade of 67 percent Fe, 2.87 percent $SiO_2$ and 0.066 percent P was obtained. Thus a two step agglomeration on the raw ore gave grades and recoveries similar to those obtained by starting with the jig concentrate.

EXAMPLE VII

About 97.5 g powdered raw Crest ore was treated with the following
1 lb/ton NaOH
60 lb/ton NaCl
1 lb/ton sulfonic acid of branched alkylbenzene
3 lb/ton "Pamak 4"
0.024 lb/ton of dextrin and 0.024 lb/ton "Amine D".

The slurry was ball-milled for 2.5 hours at 50 percent solids, and at pH 10.6, then 12 g oxidized Lloydminster crude was added as the bridging liquid. The system was ball-milled for a further 17 hours to comminute the ore particles while collecting the phosphatic and carbonate minerals. Final pH 8.75 (P fraction).

The oil agglomerate from the first step was eluted with NaOH solution at pH 10 to release included iron ore. The unagglomerated material which contains the iron units, and the washings were combined then neutralized with $H_2SO_4$ to pH 6.5. The iron units were agglomerated in a second step using 50 g oxidized Lloydminster crude oil as the bridging liquid.

As summarized in Table III, an iron product containing 62.3 percent Fe, 6.5 percent silica and 0.053 percent P was obtained with the high recovery of 86 percent of the available iron units.

TABLE III

| Product | % Fe | Total Fe Units | % Silica | % P |
|---|---|---|---|---|
| Raw crest Ore Feed | 41.2 | 100 | 29.4 | 0.35 |
| P fraction (1st step) | 16.8 | 4.2 | 7.5 | 3.15 |
| Fe product (2nd step) | 62.3 | 86.3 | 6.5 | 0.053 |
| Tailings | 12 | 9.5 | 76.0 | 0.02 |

EXAMPLE VIII

About 100 g powdered raw Crest ore were treated with the following
1 lb/ton NaOH
1 lb/ton sulfonic acid of branched chain alkylbenzene
3 lb/ton "Pamak 4"
0.024 lb/ton dextrin and 0.024 lb/ton "Amine D" (Hercules Powder Company) ball-milled tailing).

The suspension of 50 percent solids in water was ball-milled for 2.5 hours at pH 9.2. Then 10 g oxidized Lloydminster crude was added as the bridging liquid and the contents ball-milled for 16.5 hours, final pH 8.9. The oil agglomerate which contained the phosphatic and carbonate minerals (P fraction) was eluted with alkali at pH 10. The unagglomerated residues and the washings were combined dried and ashed (Fe tailing). The results obtained are summarized in Table IV. It is seen that the amount of phosphorus in the Fe fraction (tailings) can be decreased to a very acceptable level by this technique.

TABLE IV

| Fraction | % Fe | Total Fe Units | % Silica | % P |
|---|---|---|---|---|
| Raw Crest ore feed | 40.9 | 100 | 26.4 | 0.304 |
| P fraction | 18.4 | 4.3 | 10 | 2.80 |
| Fe tailings | 43.2 | 95.7 | 28.0 | 0.03 |

EXAMPLE IX

About 100 g powdered raw Crest ore and the following ingredients:
1 lb/ton "Pamak 4"
2 lb/ton NaOH
60 lb/ton NaCl
were ball-milled together at 50 percent solids for 17 hours. The contents at pH 9.1 were transferred to a kettle fitted with an agitator and containing 50 g oxidized Lloydminster crude as the bridging liquid. Small aliquot samples of suspension were analyzed periodically during the agitation in order to follow the phosphorus remaining in the tailings (Fe fraction) intended for feed in a second iron recovery step. The result of this test is summarized in Table V.

TABLE V

| Time (min) | pH | Wt. Sample Tailings g. | % Fe | % Silica | % P |
|---|---|---|---|---|---|
| 0 | 9.1 | 2.0 | 38.8 | 27.4 | 0.33 |
| 10 | 8.8 | 2.5 | — | — | 0.09 |
| 20 | 8.7 | 3.0 | 42.7 | 31.2 | <0.02 |
| 30 | 8.7 | 2.1 | 43.5 | 30.8 | <0.02 |
| 90 | 8.7 | 3.8 | 42.2 | 29.3 | <0.02 |

The final oil agglomerate after ashing contained 2.50 percent P.

The following examples illustrate the effectiveness of the treatment as applied to Wabana (Newfoundland) natural fines which contain about 1 percent P.

EXAMPLE X

About 93 g crushed Wabana ore were mixed with 50 ml water and 30 ml N/10 KOH in a 6 inch porcelain ball mill for 27 minutes using 25 flint and two steel balls, pH=11.
The pulp was conditioned with the following:
1.6 lb/ton sulfonic acid or branched chain alkylbenzene
4 lb/ton "Pamak 4"
0.024 lb/ton "Amine D"
0.040 lb/ton dextrin (as Fe depressant).

A. The suspension was comminuted to −400 mesh Tyler while the phosphatic minerals were being separated in a first step with 17.5 g oxidized Lloydminster crude and 0.12 g SAE 10 oil, as the bridging liquid. The oil agglomerate was eluted three times with 125 ml water each time. The unagglomerated portion and washings were combined, stirred with a motor agitator for several minutes and allowed to settle, pH 8.7. The settled (B) and the suspended (C) portions were separated and the iron units collected separately for each portion.

B. The settled material was neutralized with HCl to about pH 6.7. The clear liquid was decanted and the sediment was placed in the kettle containing 19 g "Esso" asphaltic roofing putty and 16.5 g Bunker C fuel oil as bridging liquids. After several hours agitation the oil phase which contained the iron units was eluted with water then with sodium carbonate up to pH 9.0. The unagglomerated middling slurry was agitated with several cc's of a liquid aliphatic hydrocarbon solvent (Varsol) using a horizontal reciprocating motion. The clayish suspended matter was separated as tailings and the agglomerated spherical bodies were separated as middling products.

The suspended portion (C) was neutralized with $H_2SO_4$ from pH 8.7 to pH 5.6. The iron units were collected in the grease kettle with 12 g asphalt base roofing putty and 11.5 g Bunker C as bridging liquid.

All separated fractions were ashed at 800° C. and analyzed. The results obtained are summarized in Table VI. The iron recovered in P fraction (A), (B) and in the (C) suspended portion product totals close to 100 percent.

TABLE VI

| Fraction | % Fe | Total Fe Units | % Silica | % P |
|---|---|---|---|---|
| Wabana ore feed (untreated) | 42.2 | 100 | 18.9 | 1.02 |
| (A) 1st step P fraction | 32.2 | 12.3 | 6.5 | 5.55 |
| settled | 47.5 | 63.8 | 23.3 | 0.24 |
| (B) 2nd step Fe product (from settled (A)) | 62.0 | 63.7**% | 5.1 | 0.16 |
| Middlings | 39.5 | 27.6**% | 18.8 | 0.53* |
| Tailings | 16.7 | 8.7**% | 60.8 | 0.08 |
| (C) Suspended portion (from 1st step (A)) | 53.8 | 23.9 | 15.2 | 0.17 |

| | | | | |
|---|---|---|---|---|
| Fe product from (C) | 63.2 | 58.1***% | 5.0 | 0.08 |
| Residue | 43.8 | 41.8***% | 22.0 | 0.08* |

*These fractions can be recycled.
**These figures are percentages of the 63.8 Fe units in settled (A) fraction.
***These figures are percentages of the 23.9 Fe units in suspended portion from (A).

EXAMPLE XI

High grade phosphorus fractions were separated from Wabana ore as follows:

About 93 g powdered ore, 50 ml water and 30 ml N/10 KOH were ball-milled for 1.5 hours with 25 flint and two steel balls. To the slurry at pH 9.9 were added 2.5 ml additional N/10 KOH, 4 lb/ton "PAMAK C15" and 1.6 lb/ton sulfonic acid of branched alkylbenzene and 0.032 lb/ton dextrin. The system was mixed for 1 hour by ball-milling. The phosphatic material was collected with 0.3 g SAE 10 oil and 11 g oxidized Lloydminster crude while ball-milling the suspension for about 40 hours. The thick slurry was diluted with 125 ml of water containing 2 ml N/10 KOH/liter in order to separate the emulsified oleagenous phase. The oil agglomerate was eluted three times with dilute alkali at pH 10. The agglomerate and a small portion of the Fe tailings were ashed at 800° C. before being analyzed. The results obtained are shown in Table VII:

TABLE VII

| Fraction | % Fe | Total Fe Units | % Silica | % P |
|---|---|---|---|---|
| Wabana Ore (untreated)Feed | 43.0 | 100 | 18.9 | 1.0 |
| P fraction Step 1 | 19.0 | 1.8 | 7.0 | 8.2 |
| Fe Tailings | 47.5 | 98.2 | 18.5 | 0.44 |

EXAMPLE XII

Example XII serves as an illustration that practically all the phosphatic material can be separated by this technique from Wabana iron ore. Wabana ore was ground in water to −400 mesh, then concentrated as a filter cake of 70 percent solids. About 113 g Wabana filter cake (70 g dry ore) was mixed in the agitator kettle with 25 ml N/10 KOH,
   1.2 lb/ton sulfonic acid branched chain alkyl benzene,
   4.0 lb/ton "Pamak 4,"
   0.6 lb/ton "Pamak C15," and
   water 10 ml.
Step (1)

A. The ore was conditioned for about 3 minutes, then 50 g oxidized Lloydminster crude was added as the bridging liquid for the phosphate minerals. The resulting slurry was agitated for 1 hour, then 100 ml water was added to cause the emulsified oleagenous mass to form an agglomerate with the pH of the aqueous tailings being 8.7. The oil agglomerate containing phosphorus fraction "$P_1$" was rinsed several times with dilute alkali at pH 9.7.

B. The unagglomerated material and the alkali washings were combined and retreated in the kettle at pH 11 with 35 g oxidized Lloydminster crude for 16 hours. The oil phase was eluted with water several times. This contains another phosphorus fraction "$P_2$."

The tailings and the elutions were combined, neutralized with $H_2SO_4$ to pH 4.7, then filtered. A small portion of this feed stock for Step (2) was ashed for analysis.
Step 2.

The remaining portion of this feed was mixed with 27 g of oxidized Lloydminster crude oil in the kettle in order to collect the iron units. The unagglomerated residues, the water and alkali elutions were combined and ashed as tailings. The results obtained are tabulated in Table VIII.

TABLE VIII

| Fraction | Percent Fe | Total Fe Units | Percent silica | Percent P |
|---|---|---|---|---|
| Untreated Wabana ore | 45.8 | 100 | 17.1 | 1.11 |
| Step (1): | | | | |
|   A, $P_1$ fraction | 41.9 | 19.3 | 3.2 | 3.91 |
|   B, $P_2$ fraction | 48.7 | 12.2 | 4.91 | 2.26 |
| Step (2) (feed-neutralized tailings from Step (L)) | 46.4 | 68.5 | 24.1 | 0.03 |
| Fe product | 64.0 | (*) | 4.5 | 0.08 |
| Tailings | 25.2 | (**) | 45.7 | 0.02 |

*75% of Step 2 (68.5).
**25% of Step 2 (68.5).
Note: The tailings from Step (1) serves as feed for Step (2). The results indicate a high grade Fe product with low P content can be obtained using a two-step operation in ores having a high P content.

Referring to FIG. 1, (for jig concentrate of Crest ore) curves 1, 2, 3 and 4 show further results relating respectively to percent Fe recovery, percent Fe in the concentrate, percent P in the agglomerate (concentrate) and percent silica in the concentrate. Similar curves were obtained for both the raw Crest ore and the Wabana natural fines. It will be observed that iron recovery falls off sharply above pH 8 and gradually below about pH 4. The amount of P in the concentrate increases gradually with pH. Above about pH 8 the collection of phosphate minerals becomes marked, reaching to what appears to be a maximum at about 8.5 – 10. In this pH region, the concentrate contains the least amount of Fe. The tailings contain most of the iron units and iron units can be separated from the gangue materials at a pH below about 8 as high grade products. The acid-insolubles associated with the concentrate are virtually constant (within acceptable limits) up to about pH 10.

Referring to FIG. 2, curves 1, 2 and 3 show the separation of phosphorus from, respectively, Wabana ore, raw Crest ore, and a jig concentrate of Crest ore, as a function of pH of the aqueous suspension. The grade of P separated increases sharply above about pH 8 to a maximum at about pH 10. The iron units contained in the tailings can be separated from the siliceous gangue in a second step of the operation (e.g. by agglomeration at a lower pH). These results show that by operating between about pH 8 – 10 the P can be selectively agglomerated from the ore, and the iron can then be recovered from the tailings in a further step. Desirably, the second step is an agglomeration at a lower pH but it may be differential settling or other operation.

We claim:
1. A method of separating siliceous and phosphatic material from iron ore containing said material without flotation which comprises (a) forming an aqueous suspension of a finely ground ore having said siliceous and phosphatic material in physically separated form, (b) adding to said suspension about 0.02 to 0.3 percent based on the weight of said ore, of a conditioning agent selected from the group consisting of long chain fatty acids and their alkali metal and ammonium salts, and combinations thereof with minor amounts of long chain sulfonic acids and their alkali metal and ammonium salts, (c) providing a pH of above 8 up to about 11, (d) agitating the resulting mixture to condition said material therein with said agent, (e) incorporating about 50 to 130 percent volume, based on the volume of solids being agglomerated, of a hydrocarbonaceous oil, (f) agitating further to form an oil agglomerate containing the bulk of the phosphatic material from said mixture and aqueous tailings containing the iron (g) separating said aqueous tailing from said oil agglomerate, (h) adjusting the pH of said tailings to about 5 to 8, to obtain a substantially neutralized tailings (i) adding a hydrocarbonaceous oil to said substantially neutralized tailings, (j) agitating the resulting mixture to form oil agglomerates containing the iron leaving a siliceous residue as tailings, and (k) separating said iron-containing agglomerates from said residue.

2. A method of separating siliceous and phosphatic material from iron ore containing said material as defined in claim 1, wherein said conditioning agent is selected from the group consisting of tall oil acids and sulfonic acids of long chain hydrocarbons.

3. A method of separating siliceous and phosphatic material from iron ore containing said material as defined in claim 2, wherein said conditioning agent comprises a major proportion of tall oil acids and a minor proportion of a sulfonic acid of a long chain hydrocarbon.

* * * * *